United States Patent
Lee

(10) Patent No.: US 10,246,239 B2
(45) Date of Patent: Apr. 2, 2019

(54) VACUUM BOTTLE SEALING APPARATUS

(71) Applicants: ROLLPACK, CO., LTD., Gyeonggi-do (KR); Kyul-Joo Lee, Chungcheongnam-do (KR)

(72) Inventor: Kyul-Joo Lee, Chungcheongnam-do (KR)

(73) Assignees: ROLLPACK, CO., LTD., Gyeonggi-do (KR); Kyul-Joo Lee, Chungcheongnam-do (KR)

(*) Notice: Subject to any disclaimer, the term of this patent is extended or adjusted under 35 U.S.C. 154(b) by 297 days.

(21) Appl. No.: 15/100,386

(22) PCT Filed: Dec. 10, 2014

(86) PCT No.: PCT/KR2014/012156
§ 371 (c)(1),
(2) Date: May 31, 2016

(87) PCT Pub. No.: WO2015/088250
PCT Pub. Date: Jun. 18, 2015

(65) Prior Publication Data
US 2016/0297597 A1    Oct. 13, 2016

(30) Foreign Application Priority Data
Dec. 12, 2013    (KR) .......................... 10-2013-0154579

(51) Int. Cl.
*B65D 81/20*    (2006.01)
*B65D 39/00*    (2006.01)
(Continued)

(52) U.S. Cl.
CPC ..... *B65D 81/2038* (2013.01); *B65D 39/0052* (2013.01); *B65D 39/16* (2013.01);
(Continued)

(58) Field of Classification Search
CPC . B65D 81/2038; B65D 39/0052; B65D 39/16
(Continued)

(56) References Cited

U.S. PATENT DOCUMENTS 7,757,725 B2 *    7/2010    Wang ................. B65D 81/2038
                                                            141/302
2013/0334162 A1 *  12/2013    Howcroft ................. A45F 3/16
                                                            215/227

FOREIGN PATENT DOCUMENTS

JP    2000300445    10/2000
KR    20060027774    3/2006
(Continued)

OTHER PUBLICATIONS

PCT International Search Report PCT/KR2014/012156, dated Feb. 5, 2015, (4 pages.).

*Primary Examiner* — James N Smalley
(74) *Attorney, Agent, or Firm* — Dority & Manning, P.A.

(57) ABSTRACT

A vacuum bottle sealing apparatus includes a lower unit disposed in an opening of a bottle; an upper unit installed on an upper portion of the lower unit; and a lifting and lowering unit disposed to pass through the lower unit and protrude inwardly of the upper unit from inside of the opening of the bottle. The lifting and lowering unit includes a lifting and lowering bar connected to the upper unit through the lower unit and lifted and lowered by the upper unit; and an elastic sealing ring mounted on an outer circumferential surface of the lifting and lowering bar and sealing am interior of the opening of the bottle as the elastic sealing ring is pressed by the lower unit and then deformed when the lifting and lowering bar is lifted.

9 Claims, 8 Drawing Sheets

(51) Int. Cl.
    *B65D 39/16*     (2006.01)
    *B65D 51/16*     (2006.01)
    *B65D 53/02*     (2006.01)
    *F16K 7/20*     (2006.01)

(52) U.S. Cl.
    CPC ......... *B65D 51/1644* (2013.01); *B65D 53/02* (2013.01); *F16K 7/20* (2013.01)

(58) Field of Classification Search
    USPC ............ 215/262, 281, 272, 330; 220/203.06, 220/203.05, 231, 580, 206.01, 202, 281, 220/270; 141/65
    See application file for complete search history.

(56) References Cited

FOREIGN PATENT DOCUMENTS

| | | |
|---|---|---|
| KR | 0445177 | 7/2009 |
| KR | 0934704 | 12/2009 |
| KR | 20100008443 | 8/2010 |
| KR | 0986313 | 10/2010 |
| KR | 20100045673 | 1/2011 |
| KR | 1144500 | 5/2012 |
| WO | WO 2013137564 | 9/2013 |

\* cited by examiner

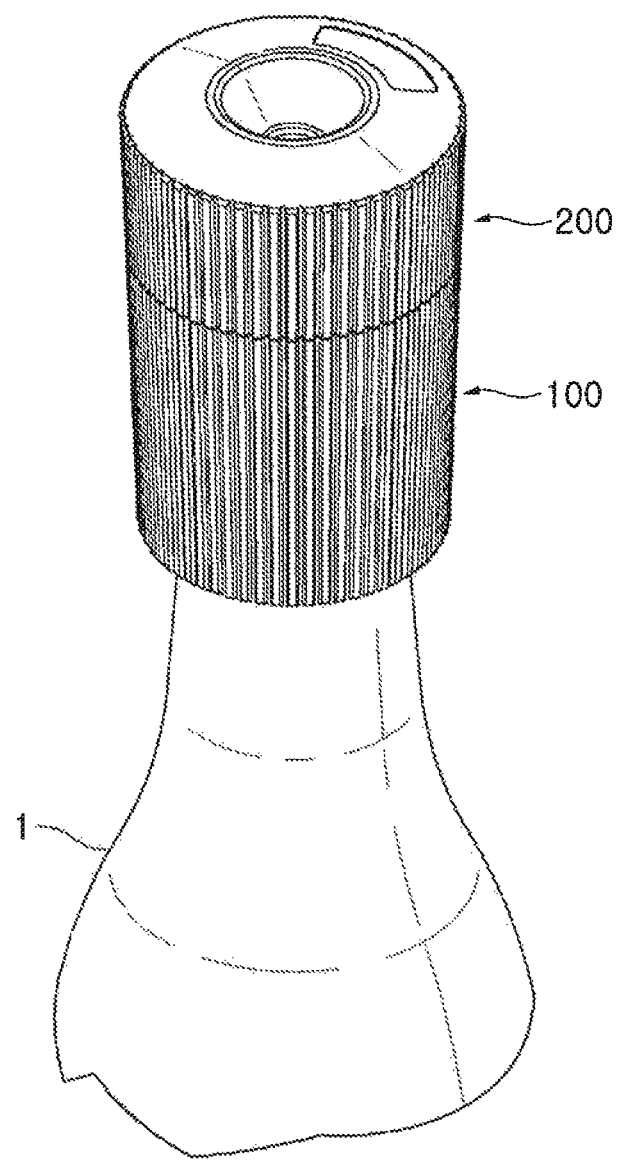
[FIG. 1]

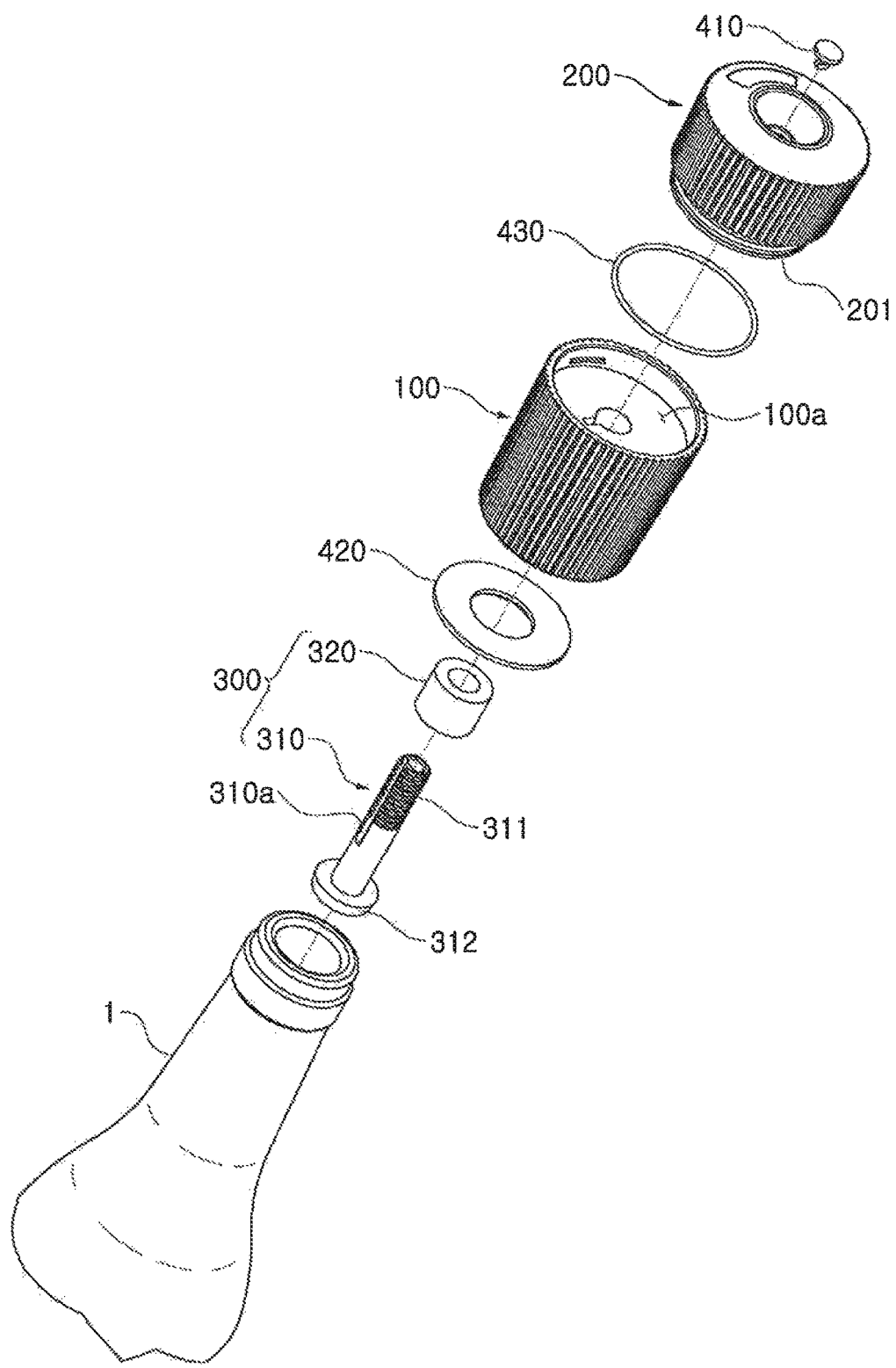
[FIG. 2]

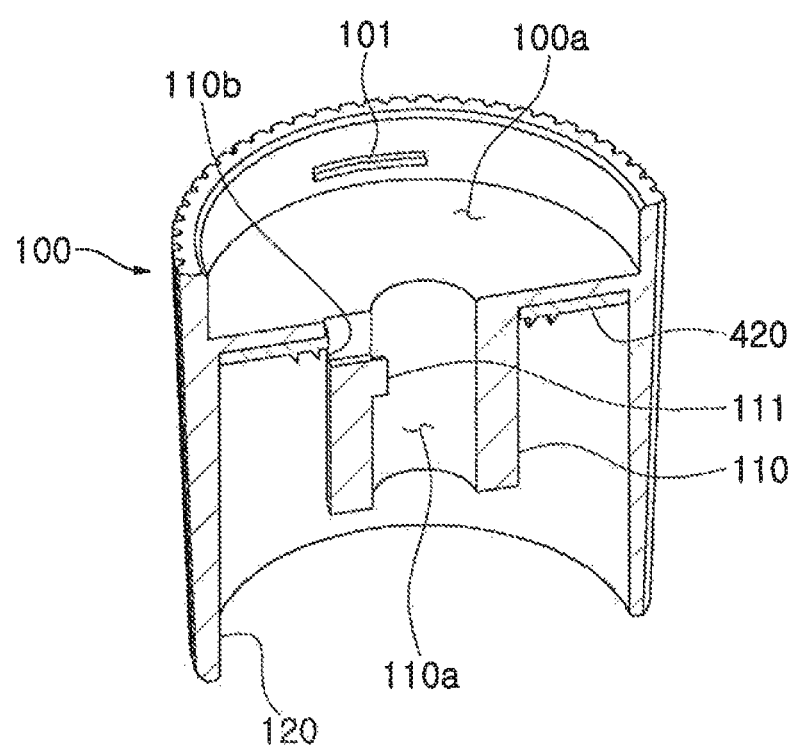
[FIG. 3]

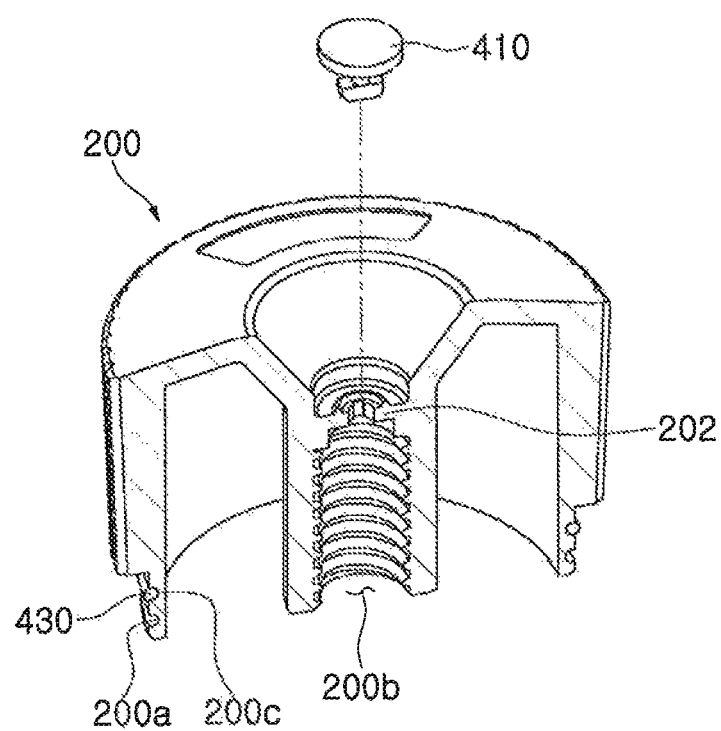
[FIG. 4]

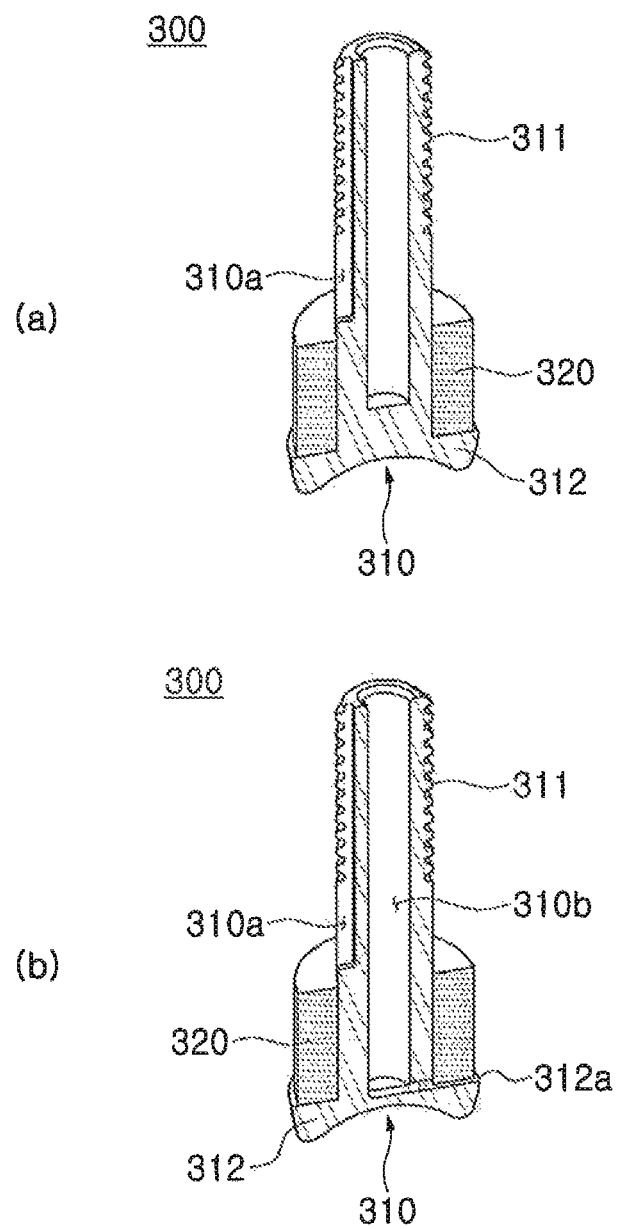
[FIG. 5]

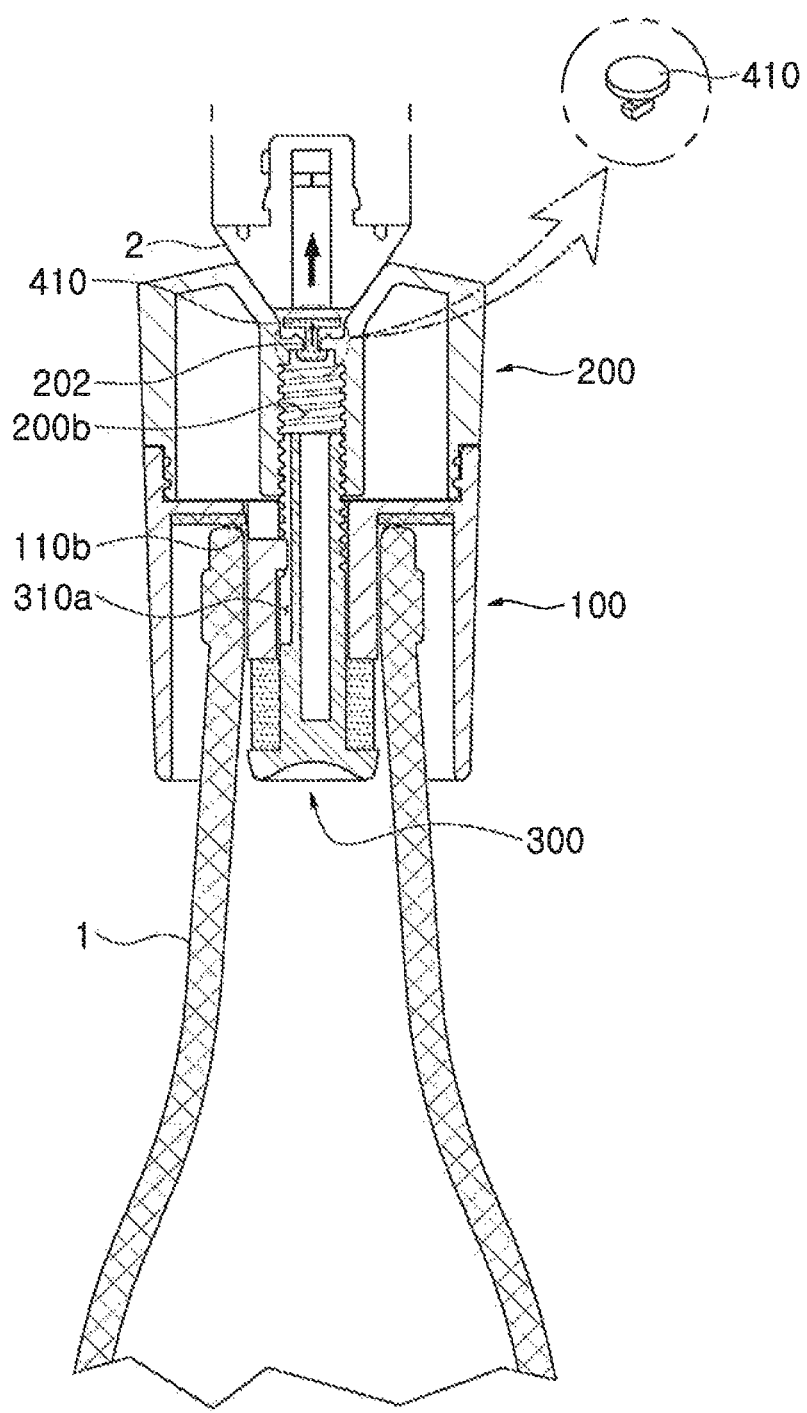
[FIG. 6]

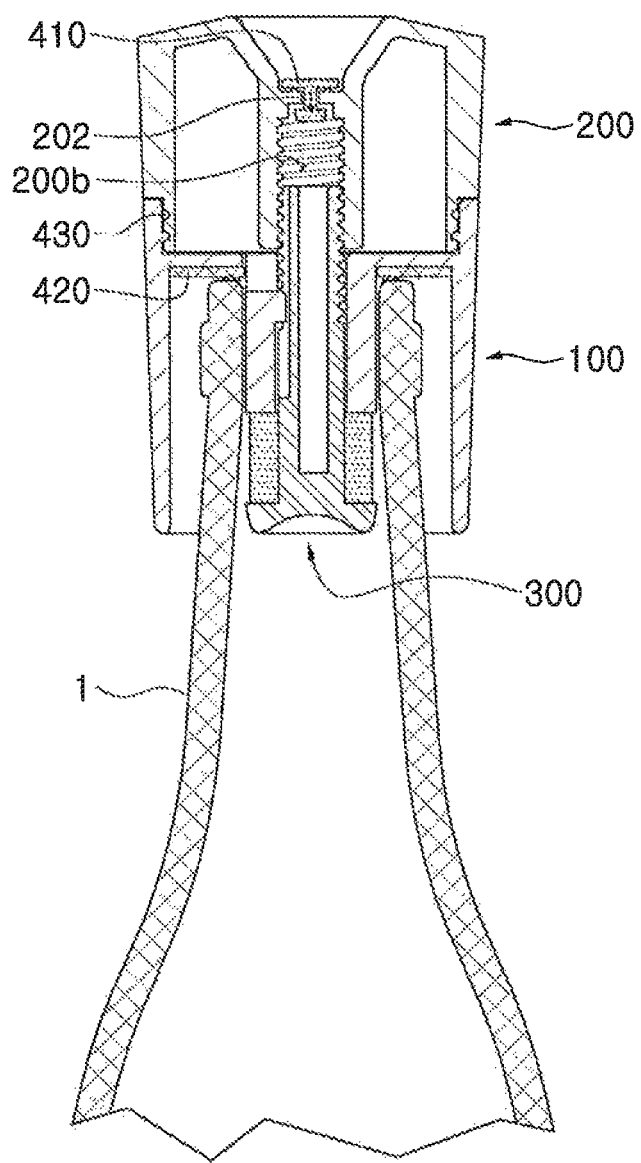
[FIG. 7]

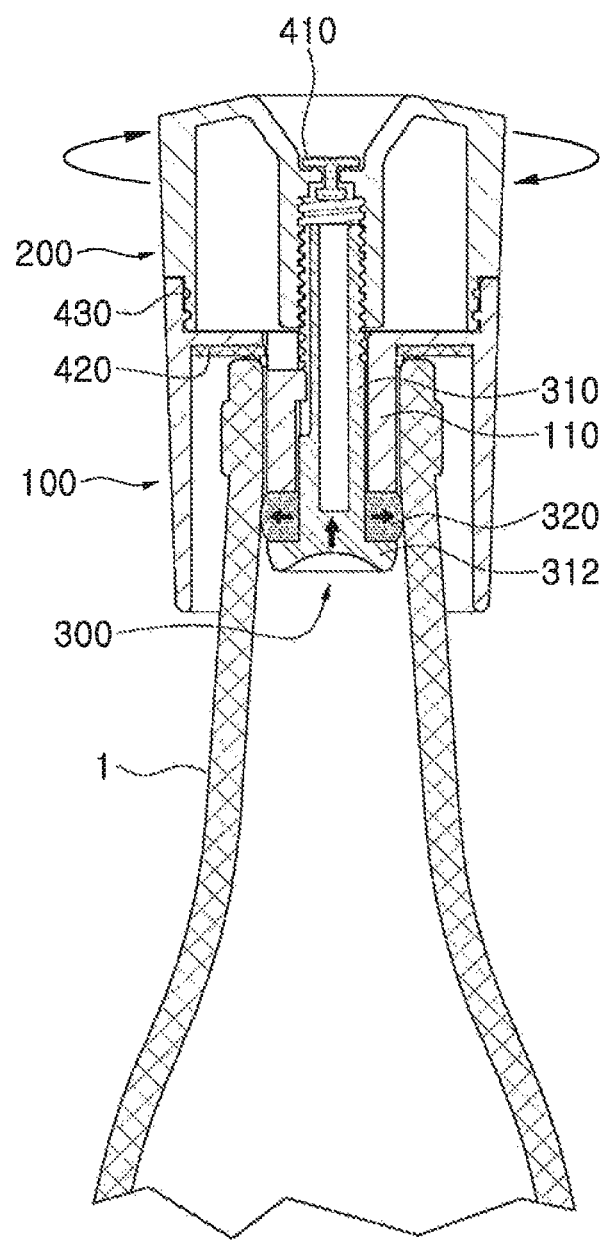
[FIG. 8]

VACUUM BOTTLE SEALING APPARATUS

CROSS-REFERENCE TO RELATED APPLICATIONS

This application is the U.S. National Stage entry of International Application Number PCT/KR2014/012156 having a filing date of Dec. 10, 2014, which claims priority to Korean Patent Application Serial Number 10-2013-0154579 having a filing date of Dec. 12, 2013, the disclosures of both of which are hereby incorporated by reference herein in their entirety for all purposes.

TECHNICAL FIELD

The present disclosure relates to a vacuum bottle sealing apparatus, and more particularly, to a vacuum bottle sealing apparatus maintaining a stable internal vacuum in a bottle for an extended period of time.

BACKGROUND ART

In general, to store food, or the like, which may easily decay at room temperature, a sealed container is commonly used.

However, through only a simple sealing operation, the decay of food can be somewhat delayed, but it may be difficult to prevent the decay of food altogether. Therefore, contents accommodated in a sealed container are stored in a refrigerator after being opened. In particular, in the case of wine in a bottle, once a stopper is removed, air slowly flows into the bottle, even if the stopper is inserted back into the bottle thereafter. Thus, wine is in contact with oxygen and becomes oxidized, whereby quality drops.

In order to store wine, food, or the like, which may easily decay, even at room temperature, for an extended period of time, a vacuum container has been proposed.

However, the vacuum container should be integrally equipped with a relatively complex pumping means for the formation of a vacuum in at least a container lid. Therefore, as costs of manufacturing a vacuum container increase, consumers are burdened with higher purchase costs.

Korean Utility Model Registration No. 0445177 disclosing a vacuum pump for a container stopper proposes a configuration in which a vacuum pump, a vacuum generating means, is provided separately from a container. In Korean Patent Laid-open Publication No. 2010-0045673, a configuration of sealing a container by providing a stopper for pumping, such as a pumping stopper, in an inlet of a container such as a bottle to combine the separate vacuum pump with the container is proposed. In addition, a stopper for a vacuum container is proposed in Korean Utility Model Laid-open Publication No. 2010-0008443.

However, even if such a stopper stably blocks an inlet due to vacuum pressure inside a container, over time, air flows into the container, so vacuum pressure inside the container is gradually lowered. Thus, if a certain period of time has elapsed, an actual vacuum inside the container may be completely released.

DISCLOSURE

Technical Problem

The present disclosure has been made to solve the above problems, and an aspect of the present disclosure is to provide a vacuum bottle sealing apparatus including a stopping means and a main sealing means to stably maintain a vacuum of a bottle for an extended period of time.

Technical Solution

According to an aspect of the present disclosure, a vacuum bottle sealing apparatus may include: a lower unit disposed in an opening of a bottle; an upper unit installed on an upper portion of the lower unit; and a lifting and lowering unit disposed to pass through the lower unit and to protrude inwardly of the upper unit from inside of the opening of the bottle. The lifting and lowering unit may include: a lifting and lowering bar connected to the upper unit through the lower unit and lifted and lowered by the upper unit; and an elastic sealing ring mounted on an outer circumferential surface of the lifting and lowering bar, and sealing an interior of the opening of the bottle as the elastic sealing ring is pressed by the lower unit and then deformed when the lifting and lowering bar is lifted. The lifting and lowering unit and the upper unit may be provided with an air discharge passage formed therethrough, and the air discharge passage may be opened and closed, according to deformation of the elastic sealing ring.

Here, the upper unit may include a bar hole formed therein to which the lifting and lowering bar is screw-fastened, and the lifting and lowering bar may be lifted and lowered along the bar hole, according to rotation of the upper unit.

In this case, the lifting and lowering bar may be provided with a key groove formed in an outer surface of the lifting and lowering bar, and the lower unit may be provided with a key, the key being formed on an inner surface of a lifting and lowering through-hole of the lower unit and being insertedly disposed in the key groove, to block rotation of the lifting and lowering bar when the upper unit is rotated.

On the other hand, the lifting and lowering bar may include a connection flow path connecting an interior of the bottle to the bar hole, and the air discharge passage may be a path connecting the connection flow path to the bar hole.

In this case, in an example, the connection flow path may include an air hole formed in a lateral surface of an insertion portion protruding downwardly to be inserted into the opening of the bottle in the lower unit, and a key groove formed in an outer surface of the lifting and lowering bar to lead to the air hole.

In another example, the connection flow path may include a discharge groove formed in an upper surface of a supporting protrusion supporting the elastic sealing ring in the lifting and lowering bar, and a discharge hole communicating with the discharge groove and connected to an upper end of the lifting and lowering bar inside the lifting and lowering bar.

In addition, the vacuum bottle sealing apparatus may further include a sub-sealing unit maintaining a vacuum when air is discharged through the air discharge passage to form the vacuum in the bottle. The sub-sealing unit may include a check valve mounted on an upper portion of the bar hole of the upper unit.

Here, the upper unit may be provided with a fastening protrusion protruding from a lateral portion of the upper unit in the upper portion of the bar hole. The check valve may be provided as an I-shaped member, and may have an upper portion and a lower portion caught by and fastened to an upper end and a lower end of the fastening protrusion, respectively. A distance between an upper end and a lower end of the check valve may be greater than a distance between an upper end and a lower end of the fastening protrusion. The upper portion of the check valve may have a size covering the upper end of the fastening protrusion, and the lower portion of the check valve may have a size not to cover the lower end of the fastening protrusion.

In this case, the sub-sealing unit may further include: an elastic plate mounted in a location in which the elastic plate is in contact with the opening of the bottle in the lower unit; and an O-ring mounted on one of the lower unit and the upper unit to be disposed in a fastening part of the lower unit and the upper unit.

Advantageous Effects

According to an exemplary embodiment in the present disclosure, a vacuum bottle sealing apparatus includes a stopping unit blocking an opening of a bottle and having an air discharge passage, and a main sealing unit sealing the opening of the bottle as the main sealing unit is lifted inside the bottle to maintain a vacuum when air is discharged through the air discharge passage of the stopping unit to form the vacuum in the bottle, whereby the internal vacuum formed in the bottle may be stably maintained for an extended period of time.

DESCRIPTION OF DRAWINGS

FIG. 1 is a perspective view illustrating a vacuum bottle sealing apparatus mounted on an opening of a bottle, according to an exemplary embodiment in the present disclosure.

FIG. 2 is an exploded perspective view illustrating the vacuum bottle sealing apparatus of FIG. 1.

FIG. 3 is a cross-sectional perspective view illustrating a lower unit of the vacuum bottle sealing apparatus of FIG. 1.

FIG. 4 is a cross-sectional perspective view illustrating an upper unit of the vacuum bottle sealing apparatus of FIG. 1.

FIG. 5A is a cross-sectional perspective view illustrating a lifting and lowering unit, a main sealing unit of the vacuum bottle sealing apparatus of FIG. 1, according to an exemplary embodiment, and FIG. 5B is a cross-sectional perspective view illustrating a lifting and lowering unit, a main sealing unit, in the vacuum bottle sealing apparatus of FIG. 1, according to another exemplary embodiment.

FIG. 6 is a view illustrating that air is discharged through the vacuum bottle sealing apparatus of FIG. 1 by operating a separate vacuum apparatus.

FIG. 7 is a longitudinal cross-sectional view illustrating that a vacuum of a bottle is maintained by a sub-sealing unit before a lifting and lowering unit, a main sealing unit, is operated, after operations of the vacuum bottle sealing apparatus of FIG. 6 are finished.

FIG. 8 is a view illustrating that an interior of an opening of a bottle is sealed by a lifting and lowering unit by rotating an upper unit in the vacuum bottle sealing apparatus of FIG. 7.

BEST MODE FOR INVENTION

A vacuum bottle sealing apparatus according to an exemplary embodiment in the present disclosure may include a stopping unit blocking an opening of a bottle and having an air discharge passage, and a main sealing unit sealing the opening of the bottle as the main sealing unit is lifted inside the bottle to maintain a vacuum when air is discharged through the air discharge passage of the stopping unit and then the vacuum is formed in the bottle, to thus stably maintain the vacuum in the bottle for an extended period of time.

Hereinafter, the present disclosure will be described in detail with reference to the drawing.

FIG. 1 is a perspective view illustrating that a vacuum bottle sealing apparatus is mounted on an opening of a bottle, according to an exemplary embodiment in the present disclosure, and FIG. 2 is an exploded perspective view illustrating the vacuum bottle sealing apparatus of FIG. 1.

In addition, FIG. 3 is a cross-sectional perspective view illustrating a lower unit in the vacuum bottle sealing apparatus of FIG. 1, FIG. 4 is a cross-sectional perspective view illustrating an upper unit in the vacuum bottle sealing apparatus of FIG. 1, and FIG. 5A is a cross-sectional perspective view illustrating a lifting and lowering unit, a main sealing unit of the vacuum bottle sealing apparatus of FIG. 1, according to an exemplary embodiment in the present disclosure.

With reference to the drawing, a vacuum bottle sealing apparatus may include a stopping unit blocking an opening of a bottle 1, and a main sealing unit provided in the stopping unit to seal the opening of the bottle 1, according to an exemplary embodiment in the present disclosure.

Here, the stopping unit blocks the opening of the bottle 1 and has an air discharge passage. In other words, the stopping unit serves to block the opening of the bottle 1, and has a structure allowing air to be externally discharged from inside of the bottle 1 while serving as a separate vacuum apparatus 2. To this end, an air discharge passage discharging air inside the bottle 1 is formed therein.

In addition, the main sealing unit serves to seal the opening of the bottle 1 to maintain a vacuum when air is discharged through the air discharge passage of the stopping unit and then a vacuum is formed in the bottle 1.

Hereinafter, the air discharge passage formed in the stopping unit will be described based on FIG. 6 for reference.

With reference to a drawing, a bar hole 200b, vertically passing through the upper unit 200 and to which a lifting and lowering bar 310 is screw-fastened, is formed in the upper unit 200. An air hole 110b is formed in a lateral surface of an upper portion of an insertion portion 110 to pass through the lower unit 100 vertically. In this case, a key groove 310a of the lifting and lowering bar 310 may communicate with the bar hole 200b and the air hole 110b.

In this case, a path on which the air hole 110b, the key groove 310a, and the bar hole 200b are connected from the inside of the bottle 1 to be connected to one another, is the air discharge passage. When air is withdrawn by the vacuum apparatus 2, air inside the bottle 1 passes through the air hole 110b, the key groove 310a, and the bar hole 200b sequentially, and is then externally discharged, thereby forming a vacuum inside the bottle 1.

Here, the stopping unit and the main sealing unit are described in detail with reference to FIGS. 1 to 5A.

The stopping unit may include the lower unit 100 insertedly disposed in the opening of the bottle 1, and the upper unit 200 rotationally mounted on an upper portion of the lower unit 100. In this case, as illustrated in FIG. 1, concave and convex lines for friction may be formed in outer surfaces of the lower unit 100 and the upper unit 200, so as to allow a user to grip the stopping unit and to easily fix or rotate the stopping unit.

In addition, the main sealing unit may include a lifting and lowering unit 300 of which an upper portion is screw-fastened to the upper unit 200 and which is installed to be moved vertically in the lower unit 100 while rotation thereof is blocked with respect to the lower unit.

The lifting and lowering unit 300 is rotation-lifted and lowered in the opening of the bottle 1 as the upper unit 200 is rotated with respect to the lower unit 100. When the lifting and lowering unit 300 is lifted during rotation-lifting and lowering, the lower portion of the main sealing unit may seal an interior of the opening of the bottle 1.

Here, the lower unit 100 is disposed to allow a lower portion of the lower unit 100 to be in contact with the opening of the bottle 1, and the upper unit 200 is fastened to the upper portion of the lower unit 100. To this end, a fastening groove 100a may be formed in the upper portion of the lower unit 100, and a fastening protruding portion 201 inserted and fastened to the fastening groove 100a may be formed in a lower portion of the upper unit 200.

In this case, a stop protrusion 101 is formed inside the fastening groove 100a of the lower unit 100, and a stop groove 200a holding the stop protrusion 101 is formed in the fastening protruding portion 201 of the upper unit 200. Thus, in a process in which the fastening protruding portion 201 of the upper unit 200 is inserted into the fastening groove 100a of the lower unit 100, as a lower end of the fastening protruding portion 201 passes through a portion of the stop protrusion 101 at a predetermined force or more, the stop protrusion 101 is inserted into the stop groove 200a, whereby the stop protrusion 101 may be caught by and fixed to the stop groove 200a.

In addition, in the lower unit 100, an insertion portion 110 protruding downwardly to be inserted into the opening of the bottle 1 may be formed in a lower portion of the lower unit 100, and an extension portion 120 may be formed by being extended downwardly from an edge of the lower portion of the lower unit 100, to surround the insertion portion 110. Thus, when the lower unit 100 is disposed in the opening of the bottle 1, the insertion portion 110 is located inside the opening of the bottle 1, and the extension portion 120 is located outside the opening of the bottle 1, thus forming a stable arrangement. Thus, the lower unit 100 may not be easily laterally separated from the opening of the bottle 1.

In addition, a lifting and lowering through-hole 110a may be formed to penetrate through the insertion portion 110 of the lower unit 100 vertically, and a bar hole 200b may be formed to penetrate through the upper unit 200 vertically.

Here, the lifting and lowering unit 300 may include a lifting and lowering bar 310 and an elastic sealing ring 320. The lifting and lowering bar 310 is insertedly disposed in the lifting and lowering through-hole 110a of the lower unit 100, and an upper portion of the lifting and lowering unit 300 having a screw line 311 is screw-fastened to the bar hole 200b of the upper unit 200. Thus, the lifting and lowering unit 300 is configured to be lifted and lowered when rotating.

In this case, the key groove 310a is formed in a longitudinal direction in an outer surface of the lifting and lowering bar 310, and a key 111 insertedly disposed in the key groove 310a is formed on an inner surface of the lifting and lowering through-hole 110a of the insertion portion 110. Thus, a fastening structure to block rotation with respect to the lower unit 100 may be provided.

Accordingly, in a state in which the lower unit 100 is fixed, when the upper unit 200, of which a lower portion is fastened to the lower unit 100, is rotated, a state in which the lifting and lowering bar 310 fastened to the lower unit 100 to block rotation is not rotated as in the lower unit 100 is maintained. Thus, as the lifting and lowering bar 310 is rotated along the bar hole 200b of the upper unit 200, the lifting and lowering bar 310 is lifted or lowered.

In addition, a supporting protrusion 312 is formed on a lower portion of the lifting and lowering bar 310, and the elastic sealing ring 320 surrounding an outer circumferential surface of the lifting and lowering bar 310 may be disposed on an upper portion of the supporting protrusion 312.

Thus, when the lifting and lowering bar 310 is lifted, a lower portion of the elastic sealing ring 320 is pressed by the supporting protrusion 312 of the lifting and lowering bar 310, and an upper portion of the elastic sealing ring 320 is pressed by a lower end of the insertion portion 110 of the lower unit 100. As the lifting and lowering bar 310 is further lifted, a degree of pressing may be increased. Thus, the elastic sealing ring 320 may be laterally expanded, thereby sealing an interior of the opening of the bottle 1.

For reference, as illustrated in FIG. 5B, the vacuum bottle sealing apparatus according to an exemplary embodiment in the present disclosure may include a lifting and lowering unit 300, a main sealing unit according to another exemplary embodiment. In the lifting and lowering bar 310, a discharge groove 312a may be formed in an upper surface of the supporting protrusion 312, and a connecting discharge hole 310b communicating with the discharge groove 312a and connected to an upper end of the lifting and lowering bar may be formed in the lifting and lowering bar. Here, an air discharge passage is a path on which the discharge groove 312a, the discharge hole 310b, and the bar hole 200b are connected from inside of the bottle 1 to be connected to one another. In this case, even when the air hole 110b is not formed in the lower unit 100, the air discharge passage may be formed therein. In addition, when the lifting and lowering bar 310 is lifted, a lower portion of the elastic sealing ring 320 is pressed by the supporting protrusion 312 of the lifting and lowering bar 310, and an upper portion of the elastic sealing ring 320 is pressed by a lower end of the insertion portion 110 of the lower unit 100. As the lifting and lowering bar 310 is further lifted, a degree of pressing may be increased. Thus, the elastic sealing ring 320 may be laterally expanded, thereby sealing an interior of the opening of the bottle 1. In addition, the elastic sealing ring 320 is expanded inwardly of the discharge groove 312a provided in a lower portion of the lifting and lowering bar, thus blocking the discharge groove 312a simultaneously with sealing the interior of the opening of the bottle.

On the other hand, the vacuum bottle sealing apparatus according to an exemplary embodiment in the present disclosure may further include a sub-sealing unit to perform a vacuum maintaining function when a vacuum is formed inside the bottle 1 as well as including the main sealing unit.

The sub-sealing unit serves to maintain a vacuum when a vacuum is formed inside the bottle 1 by discharging air through the air discharge passage of the stopping unit and, specifically, serves to seal the opening of the bottle 1 before the lifting and lowering unit 300, the main sealing unit, is operated. In addition, even after the main sealing unit is operated, the sub-sealing unit serves to perform a double sealing function of the opening of the bottle 1 performed as a double safety configuration with respect to sealing added to a sealing function of the main sealing unit.

The sub-sealing unit may include a check valve 410 mounted on an upper portion of the bar hole 200b of the upper unit 200. In order to fasten the check valve 410, a fastening protrusion 202 protruding from a lateral portion of the upper unit 200 is formed in an upper portion of the bar hole 200b of the upper unit 200.

Here, in the check valve 410 as an I-shaped member, an upper portion and a lower portion of the check valve 410 are caught by an upper end and a lower end of the fastening protrusion 202, respectively, to then be fastened to the bar hole 200b. In this case, a distance between the upper portion and the lower portion of the check valve 410 is greater than a distance between the upper end and the lower end of the fastening protrusion 202. In addition, the upper portion of the check valve 410 has a size which covers the upper end of the fastening protrusion 202, and the lower portion of the check valve 410 has a size which cannot cover the lower end of the fastening protrusion 202.

Accordingly, when air is withdrawn from an interior of the bottle 1 by the separate vacuum apparatus 2, as the check valve 410 is lifted, the lower portion of the check valve 410 is caught by the lower end of the fastening protrusion 202, while the lower portion of the check valve 410 does not entirely cover the lower end of the fastening protrusion 202. Thus, air inside the bottle 1 may pass through a region of the fastening protrusion 202 of the bar hole 200b. When suction of air is finished, as the check valve 410 is lowered, the upper portion of the check valve 410 is caught by the upper end of the fastening protrusion 202 while entirely covering the upper end of the fastening protrusion 202. Thus, air outside the bottle 1 does not pass through a region of the fastening protrusion 202 of the bar hole 200b. In addition, the check valve 410 may formed using an elastic material to improve air tightness.

In addition, the sub-sealing unit may further include an elastic plate 420 mounted in a location in which the lower unit 100 is in contact with the opening of the bottle 1, and an O-ring 430 disposed in a fastening part of the lower unit 100 and upper unit 200. In this case, the elastic plate 420 may serve to seal a gap so as not to allow air to be discharged through the gap between an inner surface of the opening of the bottle 1 and an outer lateral surface of the insertion portion 110 of the lower unit 100. In addition, the O-ring 430 may serve to seal a fastening part so as not to allow air to be discharged through the fastening part of the lower unit 100 and the upper unit 200. The O-ring 430 may be mounted in one of the lower unit 100 and the upper unit 200 to be disposed in the fastening part of the lower unit 100 and the upper unit 200. As illustrated in a drawing as an example, a portion of the O-ring 430 may be inserted and mounted in an O-ring groove 200c formed in the fastening protruding portion 201 of the upper unit 200.

Here, it will be described that the opening of the bottle 1 is sealed by the vacuum bottle sealing apparatus according to an example embodiment in the present disclosure with reference to FIGS. 6 to 8 based on FIGS. 1 to 5A.

FIG. 6 is a drawing illustrating that air is discharged through the vacuum bottle sealing apparatus of FIG. 1 by operating the separate vacuum apparatus. FIG. 7 is a longitudinal cross-sectional view illustrating that a vacuum in the bottle is maintained by the sub-sealing unit before the lifting and lowering unit, the main sealing unit, is operated after operations of the vacuum apparatus of FIG. 6 are finished. FIG. 8 is a view illustrating that an interior of the opening of the bottle is sealed by the lifting and lowering unit by rotating the upper unit in the vacuum bottle sealing apparatus of FIG. 7.

First, as illustrated in FIG. 6, when air inside the bottle 1 is withdrawn by the separate vacuum apparatus 2, air is withdrawn to the vacuum apparatus 2 through the air hole 110b, the key groove 310a, and the bar hole 200b which are the air discharge passages. Specifically, after air inside the bottle 1 passes through the air hole 110b formed in the upper portion of the insertion portion 110 of the lower unit 100, air passes through the key groove 310a of the lifting and lowering unit 300 and flows in the bar hole 200b of the upper unit 200. Then, air passes through a gap of the fastening protrusion 202 on which the check valve 410 is mounted, from the bar hole 200b, and air is withdrawn to the vacuum apparatus 2. In this case, a state in which the check valve 410 is lifted by an air suction force of the vacuum apparatus 2 is maintained.

Next, as illustrated in FIG. 7, after air suction operations of the vacuum apparatus 2 are finished, the opening of the bottle 1 is sealed for a moment by the check valve 410, the elastic plate 420, and the O-ring 430 which are the sub-sealing unit, before the opening of the bottle 1 is sealed by the lifting and lowering unit 300, a main sealing unit. In other words, discharging of air through the bar hole 200b is blocked by the check valve 410. In this case, the check valve 410 is lowered by internal low pressure, thereby sealing the upper end of the fastening protrusion 202. In addition, the elastic plate 420 seals a gap not to allow air to be discharged through the gap between an inner surface of the opening of the bottle 1 and an outer lateral surface of the insertion portion 110 of the lower unit 100, and the O-ring 430 seals a fastening part not to allow air to be discharged through the fastening part of the lower unit 100 and the upper unit 200.

As illustrated in FIG. 8, then, the opening of the bottle 1 is stably and air-tightly sealed by the lifting and lowering unit 300, the main sealing unit. To this end, the upper unit 200 is rotated to allow the lifting and lowering unit 300 to be lifted inside the opening of the bottle 1, whereby the lifting and lowering bar 310 of the lifting and lowering unit 300 is lifted. Thus, the elastic sealing ring 320 surrounding the lifting and lowering bar 310 is also lifted. As an upper portion of the lifted elastic sealing ring 320 is caught by a lower end of the insertion portion 110 of the lower unit 100, lifting of the elastic sealing ring 320 is stopped and the upper portion of the elastic sealing ring 320 is pressed by the lower end of the insertion portion 110 of the lower unit 100. In addition, a lower portion of the elastic sealing ring 320 is pressed by the supporting protrusion 312 of a lower portion of the lifting and lowering bar 310 due to the lifting and lowering bar 310 which may be continuously lifted. As the upper portion and the lower portion of the elastic sealing ring 320 are pressed by the lower end of the insertion portion 110 and the supporting protrusion 312 of the lifting and lowering bar 310, respectively, the elastic sealing ring 320 is gradually expanded laterally, thereby pressing and sealing an interior of the opening of the bottle 1.

As a result, as a portion of the interior of the bottle 1 is sealed by the elastic sealing ring 320 of the lifting and lowering unit 300, a vacuum inside the bottle 1 may be stably maintained for a long time. In addition, double and stable sealing is performed by the check valve 410, the elastic plate 420, and the O-ring 430 which are the sub-sealing unit. On the other hand, to release a vacuum inside the bottle 1, as the upper unit 200 is reversely rotated, the lifting and lowering unit 300 is lowered to allow the elastic sealing ring 320 to be contracted in a width direction. Thus, the vacuum bottle sealing apparatus may be separated from the bottle 1 using a certain level of force.

According to an exemplary embodiment in the present disclosure, the vacuum bottle sealing apparatus includes the stopping unit blocking the opening of the bottle 1 and having the air discharge passage, and the main sealing unit sealing the opening of the bottle 1 while being lifted inside the bottle 1 to maintain a vacuum as air is discharged through the air discharge passage of the stopping unit to form the vacuum inside the bottle. Thus, a vacuum inside the bottle 1 may be stably maintained for an extended period of time.

As described above, the present disclosure has been described by exemplary embodiments and drawings, but is not limited thereto. In addition, the present disclosure can be variously changed and modified within a range of equivalents of the technical ideas of the present disclosure and the above described claims by those skilled in the art in the technical field to which this present disclosure belongs.

The invention claimed is:

1. A vacuum bottle sealing apparatus comprising:
a lower unit disposed in an opening of a bottle;
an upper unit installed on an upper portion of the lower unit; and
a lifting and lowering unit disposed to pass through the lower unit and to protrude inwardly of the upper unit from inside of the opening of the bottle,
wherein the lifting and lowering unit includes a lifting and lowering bar connected to the upper unit through the lower unit and lifted and lowered by the upper unit, and an elastic sealing ring mounted on an outer circumferential surface of the lifting and lowering bar and sealing an interior of the opening of the bottle as the elastic sealing ring is pressed by the lower unit and then deformed when the lifting and lowering bar is lifted; and
the lifting and lowering unit and the upper unit are provided with an air discharge passage formed therethrough, and by the rotation of the upper unit the lifting and lowering unit is lifted with the elastic sealing ring being lifted accordingly, so that the elastic sealing ring is pressed by the lower unit and is laterally expanded and deformed to block the gap between the inner side of the inlet of the bottle and the lifting and lowering bar, the space between the inside of the bottle and the air discharge passage being blocked.

2. The vacuum bottle sealing apparatus of claim 1, wherein the upper unit comprises a bar hole formed therein to which the lifting and lowering bar is screw-fastened, and the lifting and lowering bar is lifted and lowered along the bar hole according to rotation of the upper unit.

3. The vacuum bottle sealing apparatus of claim 2, wherein the lifting and lowering bar is provided with a key groove formed in an outer surface of the lifting and lowering bar, and the lower unit is provided with a key, the key being formed on an inner surface of a lifting and lowering throughhole of the lower unit and being insertedly disposed in the key groove, to block rotation of the lifting and lowering bar when the upper unit is rotated.

4. The vacuum bottle sealing apparatus of claim 2, wherein the lifting and lowering bar comprises a connection flow path connecting an interior of the bottle to the bar hole, and the air discharge passage is a path connecting the connection flow path to the bar hole.

5. The vacuum bottle sealing apparatus of claim 4, wherein the connection flow path comprises an air hole formed in a lateral surface of an insertion portion protruding downwardly to be inserted into the opening of the bottle in the lower unit, and a key groove formed in an outer surface of the lifting and lowering bar to lead to the air hole.

6. The vacuum bottle sealing apparatus of claim 4, wherein the connection flow path comprises a discharge groove formed in an upper surface of a supporting protrusion supporting the elastic sealing ring in the lifting and lowering bar, and a discharge hole communicating with the discharge groove and connected to an upper end of the lifting and lowering bar inside the lifting and lowering bar.

7. The vacuum bottle sealing apparatus of claim 2, further comprising:
a sub-sealing unit maintaining a vacuum, when air is discharged through the air discharge passage to form the vacuum inside the bottle;
wherein the sub-sealing unit includes a check valve mounted on an upper portion of the bar hole of the upper unit.

8. The vacuum bottle sealing apparatus of claim 7, wherein the upper unit is provided with a fastening protrusion protruding from a lateral portion of the upper unit in the upper portion of the bar hole,
the check valve is provided as an I-shaped member, and has an upper portion and a lower portion caught by and fastened to an upper end and a lower end of the fastening protrusion, respectively,
a distance between an upper end and a lower end of the check valve is greater than a distance between the upper end and the lower end of the fastening protrusion, and
the upper portion of the check valve has a size covering the upper end of the fastening protrusion, and the lower portion of the check valve has a size not to cover the lower end of the fastening protrusion.

9. The vacuum bottle sealing apparatus of claim 7, wherein the sub-sealing unit further comprises an elastic plate mounted in a location in which the elastic plate is in contact with the opening of the bottle in the lower unit, and an O-ring mounted on one of the lower unit and the upper unit to be disposed in a fastening part of the lower unit and the upper unit.

* * * * *